United States Patent Office 3,627,497
Patented Dec. 14, 1971

3,627,497
APPARATUS FOR CATALYTIC AMMONIA OXIDATION
Louis A. Klein, Flushing, and Daniel J. Newman, Jackson Heights, N.Y., assignors to Chemical Construction Corporation, New York, N.Y.
Filed Jan. 12, 1970, Ser. No. 2,036
Int. Cl. B01j 9/04; B01d 46/00; C22b 11/00
U.S. Cl. 23—288                              8 Claims

ABSTRACT OF THE DISCLOSURE

An improved apparatus is provided for catalytic ammonia oxidation and recovery of particles of platinum group metal entrained in the hot process gas mixture formed by the catalytic reaction, which takes place in contact with a vertically oriented cylindrical platinum group metal catalyst gauze which is combined with a vertically oriented cylindrical filter principally composed of a porous refractory filter medium such as ceramic fiber.

BACKGROUND OF THE INVENTION

Field of the invention

The invention relates to the production of nitrogen oxides by the catalytic oxidation of ammonia vapor with air or other oxygen-containing gas, which gaseous reaction takes place at elevated temperature in contact with a platinum group metals gauze catalyst typically consisting of a 90% platinum-10% rhodium alloy. The resulting hot process gas stream containing nitrogen oxides is cooled and preferably employed to produce nitric acid or nitrogen tetroxide.

Description of the prior art

Typical arrangements of platinum gauze catalysts for catalytic ammonia oxidation, including cylindrical configurations, are shown in U.S. Pats. Nos. 1,321,376; 1,696,528; 1,889,549; 1,894,992; 1,927,508; and 1,986,396. Typical overall arrangements of nitric acid processes employing catalytic ammonia vapor oxidation to produce nitrogen oxides for absorption to produce nitric acid are shown in U.S. Pat. No. 2,090,921 and U.S. Patent application Nos. 713,058 filed Mar. 14, 1968, now U.S. Patent No. 3,542,510 issued Nov. 24, 1970, and 832,922 filed June 13, 1969. A horizontal platinum catalyst gauze arrangement with associated filter mass is shown in U.S. Patent No. 2,920,953. The catalytic oxidation of ammonia vapor to produce nitrogen tetroxide is described in U.S. Pat. No. 3,102,788.

SUMMARY OF THE INVENTION

In the present invention, the catalytic oxidation of ammonia vapor with air, oxygen-enriched air or the like takes place in a vertically oriented cylindrical container. The gaseous process feed mixture typically containing about 10% ammonia vapor and excess free oxygen is passed downwards into the container and flows substantially horizontally in a radial direction through a vertically oriented cylindrical catalyst gauze, which is coaxial with the container and composed of a platinum group metal such as platinum, rhodium, palladium or alloys of these metals. A catalytic reaction takes place at elevated temperature in the gauze between the ammonia vapor and free oxygen, with the resultant formation of a hot process gas stream containing nitrogen oxides. The hot gas stream also contains a small proportion of entrained metallic particles derived from the gauze and the particles are recovered in accord with the present invention by passing the hot gas stream from the cylindrical gauze through an associated coaxial vertically oriented cylindrical filter composed of refractory filter medium such as a fibrous medium or fiber typically consisting of ceramic fiber, glass fibers or asbestos fiber. The filter may be concentrically disposed externally to and spaced from the gauze, or in an alternative embodiment the filter depends downwards below and coaxial with the gauze. In any case, the filter is provided with a lower circular baffle, so that the hot process gas stream is diverted substantially horizontally and radially through the cylindrical filter. The hot filtered process gas discharged from the filter is cooled by heat exchange with a fluid such as water or the tail gas from a high pressure nitric acid process, and the cooled process gas stream containing nitrogen oxides is passed to utilization in the production of nitric acid, nitrogen tetroxide or the like.

The principal advantages of the present invention are that the apparatus may be dismantled for pickling, cleaning, regeneration or the like without disturbing the downstream apparatus elements in the train. Another advantage is that the apparatus arrangement is compact and readily assembled, and is less costly than prior art arrangements such as those which include a flat horizontal gauze and filter. In addition, because of the coaxial cylindrical arrangement of the apparatus elements, the combination may be erected using coupling flanges and gaskets of smaller diameter and dimension, which reduces the possibility of leakage of process gas into the atmosphere.

It is an object of the present invention to provide an improved apparatus for the catalytic oxidation of ammonia vapor to nitrogen oxides.

Another object is to provide an improved apparatus for this purpose which is compact and readily assembled.

A further object is to provide an apparatus for this process which is less costly to fabricate and erect.

An additional object is to provide an apparatus combination which is unitary and thus may be disassembled without disturbing downstream apparatus units and elements.

Still another object is to provide an apparatus for the catalytic oxidation of ammonia vapor to nitrogen oxides which combines a cylindrical reaction vessel or container, a cylindrical reaction gauze and a cylindrical filter in a co-acting coaxial combination.

These and other objects and adavntages of the present invention will become evident from the description which follows.

DESCRIPTION OF THE DRAWINGS AND PREFERRED EMBODIMENTS

Referring to the drawings, FIG. 1 is a sectional elevation view of one embodiment of the invention, FIG. 2 is a plan view of FIG. 1, taken on section 2—2, and FIG. 3 is a sectional elevation view of an alternative embodiment of the invention.

Referring now to FIG. 1, a feed process gas stream 1 is passed vertically downwards through the vertical oriented cylindrical inlet conduit 2. Stream 1 contains ammonia vapor and free oxygen, typically in the form of air, and stream 1 generally contains about 8% to about 10% ammonia vapor content by volume, balance air. The feed process gas stream passes from conduit 2 into the frusto-conical transition piece 3, which is attached by bracket, flange or weld 4 to the main support flange 5 from which the main apparatus elements of the present invention depend downwards. The flange 5 is generally a flat horizontal ring-shaped member which extends inwards from an outer circular perimeter to an inner circular perimeter which defines a central opening for downwards flow of the feed process gas. Member 5 is clamped or otherwise supported by a gasketed joint with flange 6, which defines the upper perimeter of the vertically oriented cylindrical reaction container. A catalyst basket 7 consisting of a vertically oriented cylindrical platinum group metal gauze, which is a catalyst for the exothermic elevated temperature gaseous reaction between ammonia and oxygen to form nitrogen oxides and water vapor, depends from the inner circular perimeter of flange 5. Gauze 7 is basically a wire mesh composed of a platinum group metal such as platinum, rhodium or palladium or an alloy of these metals such as a basically platinum alloy containing up to about 10% rhodium. The feed process gas mixture passes substantially horizontally and radially outwards through gauze 7, with resulting reaction and formation of nitrogen oxides. In addition, a small proportion of metallic particles from gauze 7 becomes entrained in the hot reacted process gas stream discharged radially outwards from gauze 7. Downwards axial flow below gauze 7 of feed process gas within the cylindrical passage defined by gauze 7 is prevented by the provision of a lower flat horizontal circular or disc-shaped baffle 8, which extends across the lower perimeter of gauze 7.

The hot reacted process gas stream discharged radially outwards in a generally horizontal flow pattern from gauze 7 next flows generally horizontally through the vertically oriented cylindrical filter 9, which is coaxial with gauze 7 and externally and concentrically spaced from gauze 7. The entrained solid particles of metallic material in the hot reacted process gas stream discharged outwards from gauze 7 are filtered from the gas phase and deposited on filter 9, which generally consists of suitable refractory material particles on fiber, such as ceramic fiber, glass fibers or asbestos fiber. Downwards axial flow below filter 9 of hot reacted process gas within the cylindrical passage defined by filter 9 is prevented by the provision of a lower flat horizontal circular or disc-shaped baffle 10, which extends across the lower perimeter of filter 9.

The hot reacted and filtered process gas stream discharged radially outwards in a generaly horizontal flow pattern from filter 9 is next diverted vertically downwards by the vertically oriented cylindrical reaction container or vessel 11, which is coaxial with filter 9 and gauze 7 and externally and concentrically spaced from filter 9. The cylindrical container 11 depends from flange 6, and vessel 11 is preferably surrounded by an outer annular jacket or container 12, and a cooling fluid such as cooling water, or boiler feed or condensate water, is circulated in the annular space between members 11 and 12 to provide a cooling effect by indirect heat exchange with the hot reacted process gas, which cools the apparatus and also preferably serves to generate usable process steam. The resulting warmed cooling water or mixture of water and generated steam is removed from the annular space between container 11 and jacket 12 via upper nozzle 13, which generally passes stream 14 preferably consisting of steam and entrained liquid water to a separating steam drum or the like, not shown.

The hot reacted process gas flowing downwards from the annular space between filter 9 and container 11 is now preferably further cooled, typically by further indirect heat exchange with boiler feed or condensate water or by indirect heat exchange with the cold tail gas from a high pressure nitric acid process, which is thereby heated prior to useful power recovery via expansion through a gas turbine or the like. The hot reacted process gas flows through a lower space defined below cooling jacket 15, which preferably extends from jacket 12, and partition or baffle 16, which preferably extends from the lower perimeter of container 11. An enclosure partition 17 extends downwards from the terminus of jacket 15, and an inner refractory lining 18 is provided on the inner surface of partition 17. A U-tube or cooling coil 19, which may in practice consist of a plurality of tubes or coils in parallel or series, is disposed below partition 16 and in indirect heat exchange with the hot reacted gas stream flowing downwards from between filter 9 and container 11. Element 19 extends through partition 17 and lining 18, and cooling fluid stream 20 is passed into tube 19 and is heated and/or vaporized in unit 19, with the resultant heated or vaporized fluid being withdrawn from unit 19 via stream 21. As mentioned supra, stream 20 typically consists of boiler feed or condensate water, or steam, or the tail gas from a high pressure nitric acid process. A lower horizontal partition 22 and cooling jacket 23 are provided below coil 19 and extending from partition 17, and a cooling fluid such as water is circulated between elements 22 and 23. The cooled reacted process gas stream discharged from between partitions 16 and 22 is now passed to further process utilization and recovery of nitrogen oxides as nitric acid by absorption in an aqueous medium or as nitrogen tetroxide, as discussed supra.

FIG. 2 is a sectional plan view of FIG. 1, taken on section 2—2, and shows the coaxial concentric arrangement of elements 7, 9, 11 and 12 in circular cross-section.

Referring now to FIG. 3, an alternative embodiment of the invention is illustrated, in which the vertically oriented cylindrical filter depends coaxially downwards below the vertically oriented cylindrical gauze. A once-through heat exchanger for the cooling of hot reacted process gas is also shown in FIG. 3. The process sequence in FIG. 3 is essentially similar to that of FIG. 1 described supra, and therefore process aspects of the apparatus combination of FIG. 3 will only be briefly described. Feed process gas stream 24 containing ammonia vapor and oxygen passes downwards through vertical conduit 25, which terminates at an upper opening in gas distributing container 26. The feed gas flows laterally outwards within vessel 26 above the upper flat horizontal circular or disc-shaped baffle 27. The vertically oriented cylindrical catalyst gauze or basket 28, composed of a platinum group metal or alloy, depends downwards from the outer perimeter of baffle 27, so that the feed process gas stream which is diverted outwards above baffle 27 next flows downwards in the annular passage between gauze 28 and container 26 and substantially horizontally and radially inwards through gauze 28, with the resultant catalytic oxidation of ammonia and formation of nitrogen oxides in a hot reacted process gas stream. The gauze 28 extends downwards to the inner circular perimeter of the flat horizontal ring-shaped annular baffle 29, and a vertically oriented cylindrical baffle 30 which is coaxial with gauze 28 preferably depends downwards from the inner perimeter of baffle 29, so that the hot reacted process gas stream discharged inwards into the vertical cylindrical passage defined by and within gauze 28 flow downwards through baffle 30. The downflowing hot reacted process gas stream within cylindrical baffle 30 contains entrained metallic particles or dust derived from gauze 28, as well as nitrogen oxides.

A flat horizonta ring-shaped annular baffle 31 preferably depends from baffle 30, and baffle 31 preferably extends outwards from the lower perimeter of baffle 30. The filter medium 30 preferably composed of a refractory medium or fiber such as ceramic fiber, glass fibers or asbestos fiber depends downward from baffle 31. Filter 32 is generally vertically oriented and cylindrical in configuration, and is coaxial with baffle 30 and gauze 28. A lower flat horizontal disc-shaped baffle 33 is disposed across the lower end of the filter 32, with the circular perimeter of baffle 33 being contiguous with the lower perimeter of filter 32, so that the hot reacted process gas stream flowing downwards through cylindrical baffle 30 is diverted substantially horizontally and radially outwards through filter 32, with resultant deposition of entrained solid metallic particles from the hot gas stream onto and within filter 32.

The resulting filtered hot reacted gas stream discharged outwards from filter 32 is diverted downwards by the vertically oriented cylindrical container 34, which is concentrically disposed external to and spaced from filter 32, and is coaxial with filter 32. An annular cooling jacket 35 is disposed external to container 34, and a cooling fluid such as water is circulated in the annular space between elements 34 and 35, in most cases with the resultant generation of steam, which is similar to the arrangement described supra with respect to FIG. 1. The filtered hot reacted gas flows downwards through the annular space between filter 32 and container 34, and into a gas cooling space between upper cooling jacket 36 and partition or baffle 37, and lower partition or baffle 38 and cooling jacket 39. Water or other cooling fluid is circulated between jacket 36 and baffle 37, and also between jacket 39 and baffle 38. A vertical closure partition or baffle 40 extends from the terminus or one end of jacket 36 and the end of jacket 39, and element 40 also contacts baffles 37 and 38 to provide a fluid sealing closure. A layer 41 consisting of refractory insulation is provided on the inner surface of baffle 40, and layer 41 may consist of any suitable refractory material such as asbestos, fireclay bricks, etc. A cooling fluid such as relatively cold tail gas from a high pressure nitric acid process is passed via stream 42 into horizontal inlet pipe 43, which extends through baffle 40 and layer 41 and passes stream 42 into header or manifold 44, from which the cooling fluid is passed through the plurality of horizontal tubes 45 and in indirect heat exchange with the hot process gas stream passing downwards below baffle 37 from between filter 32 and container 34. The hot process gas stream is thereby cooled and is passed laterally between baffles 37 and 38 to further processing for utilization as a source of nitrogen oxides in the production of nitric acid, nitrogen tetroxide, or the like. The heated fluid discharged from tubes 45 into header or manifold 46 is removed via outlet duct 47, which passes the heated fluid stream 48 to further utilization, which in the case of the tail gas from a nitric acid plant usually includes expansion through a gas turbine or other mechanical power recovery means for the recovery of usable power.

Numerous alternatives within the scope of the present invention will occur to those skilled in the art. In some instances, referring to FIG. 3, baffles 30 and 31 may be omitted, in which case the filter 32 would depend from the inner circular perimeter of baffle 29.

We claim:
1. An apparatus for the catalytic oxidation of ammonia to nitrogen oxides which comprises a vertically oriented cylindrical container, means to pass a feed process gas mixture containing ammonia and free oxygen into the upper end of said container, whereby said feed process gas mixture flows downwards within said container, a vertically oriented cylindrical foraminous platinum group metal catalyst gauze, said gauze being coaxially disposed within said container and provided with a first circular horizontal gas diversion baffle across one end, whereby the downflowing feed process gas mixture within said container is diverted substantially horizontally and flows through said gauze, and ammonia contained in said feed process gas mixture is catalytically oxidized at elevated temperature to nitrogen oxides and water vapor, a vertically oriented cylindrical filter, said filter being coaxially disposed within said container adjacent to said gauze and composed of refractory filter medium, said filter being provided with a second circular horizontal gas diversion baffle, said second baffle extending across the lower end of said filter, whereby the resulting hot process gas mixture containing nitrogen oxides and water vapor discharged from said gauze passes substantially horizontally through said filter and entrained particles of platinum group metal are deposited on said filter medium, and means to remove the resulting hot process gas mixture from the lower end of said container.

2. The apparatus of claim 1, in which said platinum group metal catalyst gauze is principally composed of a platinum group metal selected from the group consisting of platinum, rhodium, palladium, and alloys thereof.

3. The apparatus of claim 1, in which said container is provided with an external annular cooling jacket, said jacket containing water which is at least partially vaporized to steam by indirect heat exchange with said resulting hot process gas mixture.

4. The apparatus of claim 1, in which said refractory filter medium is a fibrous medium principally composed of a fiber selected from the group consisting of ceramic fiber, glass fiber and asbestos fiber.

5. The apparatus of claim 1, in which at least one heat exchange tube is disposed below said second baffle, together with means to circulate a fluid through said tube, whereby said resulting hot process gas mixture is cooled by indirect heat exchange with said fluid and said fluid is heated.

6. The apparatus of claim 1, in which said filter is concentrically disposed external to and spaced from said gauze, said first circular horizontal gas diversion baffle extends across the lower end of said gauze, and a flat horizontal ring-shaped baffle extends inwards from said container across the upper end of said filter and terminates with an inner circular perimeter at the upper end of said gauze, whereby said gauze and said filter depend downwards from said horizontal ring-shaped baffle.

7. The apparatus of claim 1, in which said filter depends downwards below said gauze, and said first circular horizontal gas diversion baffle extends across the upper end of said gauze.

8. The apparatus of claim 7, in which a vertical cylindrical baffle depends downwards from said gauze, and said filter depends downwards from said vertical cylindrical baffle.

References Cited
UNITED STATES PATENTS

| | | | |
|---|---|---|---|
| 1,889,549 | 11/1932 | Hechenbleikner et al. | 23—288 |
| 3,434,826 | 3/1969 | Holzmann | 75—83 |
| 2,226,113 | 12/1940 | Chastain, Jr. | 23—288 X |
| 1,986,396 | 1/1935 | Handforth et al. | 23—162 |
| 2,920,953 | 1/1960 | Rudorfer | 75—101 |
| 1,321,376 | 11/1919 | Jones et al. | 23—288 X |
| 2,226,149 | 12/1940 | Zimmermann | 23—288 X |
| 2,327,225 | 8/1943 | Taylor | 55—380 X |
| 3,057,138 | 10/1962 | Huxster | 55—486 |

JOSEPH SCOVRONEK, Primary Examiner

U.S. Cl. X.R.

23—162; 55—268, 380; 75—83, 135